Aug. 17, 1954 W. W. SLOANE 2,686,590
SELF-CENTERING BELT CONVEYER AND DIRECTION
CHANGING PULLEY THEREFOR
Filed Sept. 15, 1951 2 Sheets-Sheet 1
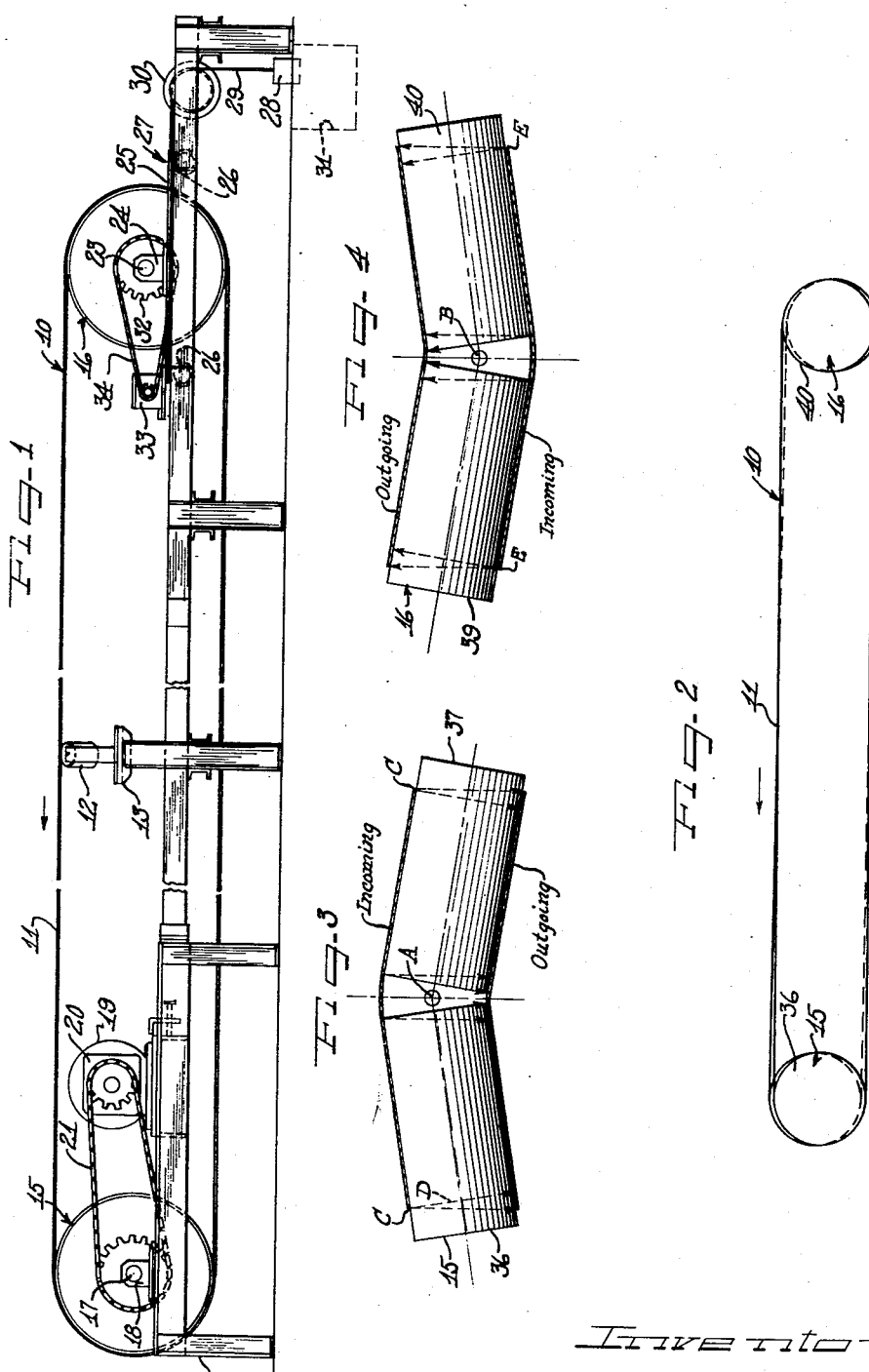
Inventor
William W. Sloane
Murray A. Gleeson
Atty

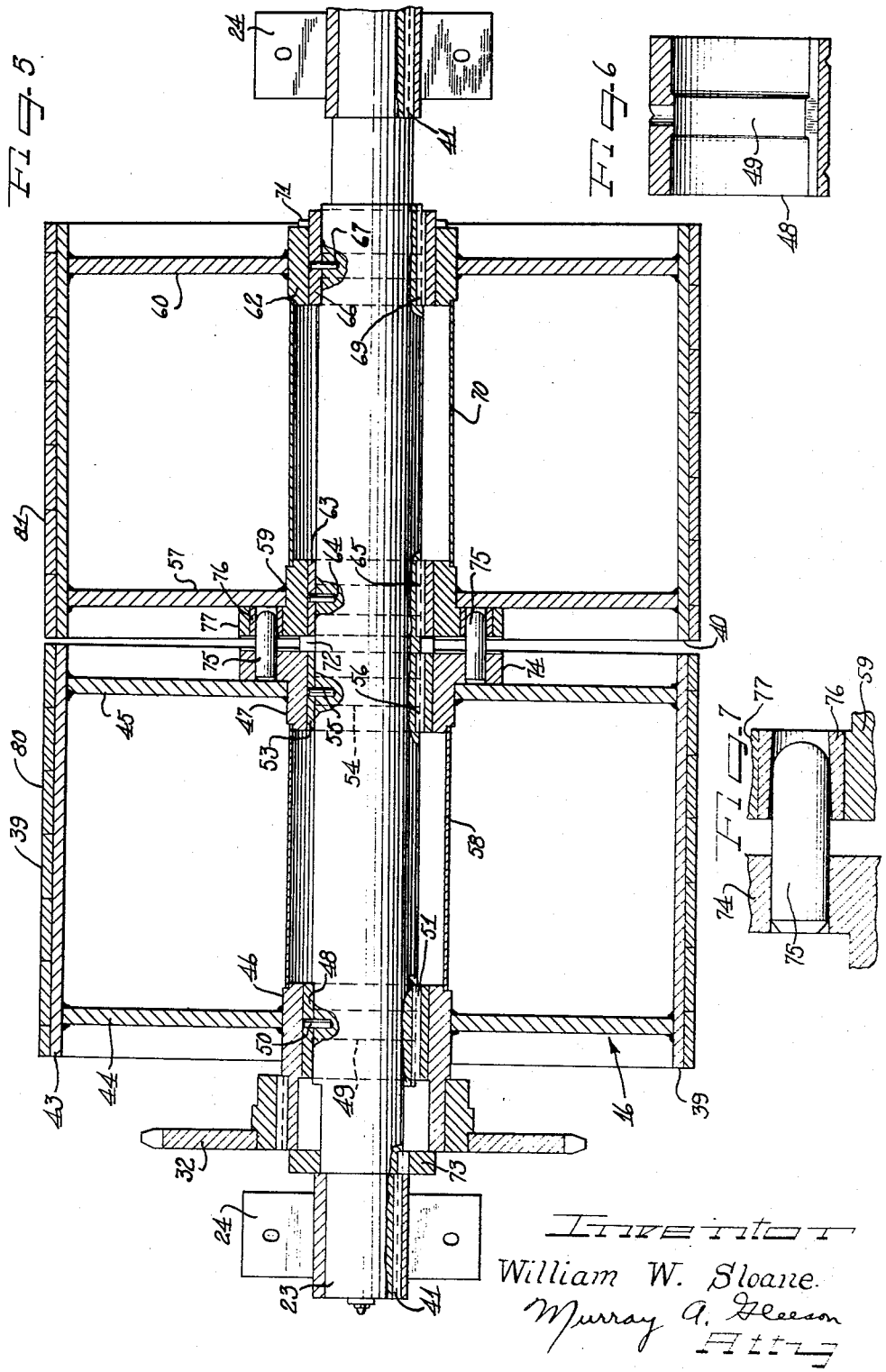

Patented Aug. 17, 1954

2,686,590

UNITED STATES PATENT OFFICE 2,686,590

SELF-CENTERING BELT CONVEYER AND DIRECTION CHANGING PULLEY THEREFOR

William W. Sloane, Chicago, Ill., assignor to Goodman Manufacturing Company, Chicago, Ill., a corporation of Illinois Application September 15, 1951, Serial No. 246,733

13 Claims. (Cl. 198—202)

1

This invention relates to improvements in belt conveyors and more particularly relates to self-centering belt conveyors and direction changing pulleys for the belts thereof.

In belt conveyors and particularly conveyors of the load-forming type where an endless steel belt is used as the material carrying medium and is stretched taut between its driving and driven direction changing pulleys at the ends of the conveyor, and is formed to a trough-like form by the load thereon, there is a tendency for the belt to move out of alignment with its direction changing rollers, which is difficult to overcome.

Various arrangements have been provided to realign the belt, such as idlers engaging the side edges of the belt or hand-operated devices for realigning the belts, requiring frequent attention. Also, various forms of pulleys having convex faces, and self-aligning pulleys tilting one way or another as the belt comes out of alignment and returning to a central location when the belt has become aligned have been used to align the belt. None of these devices, however, have been found to be entirely satisfactory to realign the belt.

A principal object of my invention is to provide a novel form and arrangement of self-aligning direction changing pulleys for the belt of a conveyor having the faces thereof so arranged as to urge the belt toward the centers of the pulleys by contact therewith.

A further object of my invention is to provide a novel and improved form of belt conveyor wherein the direction changing pulleys at opposite ends of the conveyor have belt contact surfaces inclined about the longitudinal center of the conveyor and in opposite directions with respect to the load carrying run of the belt.

A further object of my invention is to provide a self-aligning belt conveyor including an endless belt and driving and driven direction changing pulleys therefor, having inclined belt contact surfaces inclined about axes intersecting the longitudinal center of the conveyor, the axes of rotation of the drive pulley being inclined in one direction with respect to the load carrying run of the conveyor belt and the axes of rotation of the idler pulley being inclined in an opposite direction with respect to the load carrying run of the conveyor belt.

A further object of my invention is to provide a self-aligning direction changing pulley for a belt conveyor comprising two rollers arranged in end-to-end relation and tilted about a common center to present a convex surface on the incoming side of the belt and a concave surface on the outgoing side of the belt.

A still further and more detailed object of my invention is to provide a self-centering direction changing pulley for belt conveyors in two halves in the form of two connected rollers arranged in end-to-end relation and having equal area belt contact surfaces rotating about axes tilted about a common center intersecting the longitudinal axis of the conveyor, and positioning the belt contact surfaces of the two rollers to present a convex surface on the incoming side of the belt and a concave surface on the outgoing side of the belt.

These and other objects of my invention will appear from time to time as the following specification proceeds and with reference to the accompanying drawings wherein:

Figure 1 is a view in side elevation illustrating a form of self-aligning belt conveyor constructed in accordance with my invention;

Figure 2 is a diagrammatic view in side elevation of a self-aligning belt conveyor constructed in accordance with my invention;

Figure 3 is an exaggerated diagrammatic view of the drive pulley of the conveyor;

Figure 4 is an exaggerated diagrammatic view of the driven pulley of the conveyor;

Figure 5 is a transverse sectional view taken through the idler direction changing pulley of the conveyor;

Figure 6 is a detail sectional view of a bearing for one of the rollers of the pulley; and Figure 7 is a fragmentary detail sectional view illustrating the drive from one roller to the other.

In the embodiment of my invention illustrated in Figure 1 of the drawings, I have illustrated generally a belt conveyor 10 which may be of the load-forming type, and may utilize an endless steel belt 11 to carry the load which belt may be formed to a trough-like form by the load thereon. The belt 11 may be supported intermediate its ends in the form of a trough when loaded, on a plurality of spaced, troughed idler rollers 12, 12. Said idler rollers are shown as being mounted on supports 13, 13, herein shown as being mounted on a frame structure 14 of the conveyor. Only one set of idler rollers and support is shown herein, although it is readily understood that intermediate idlers are provided along the frame structure for the conveyor at definite intervals, depending upon the length of the conveyor and the load to be carried thereby. A direction changing drive pulley 15 is shown at the outby end of the conveyor while a direction changing idler pulley 16 is shown at the inby end of the conveyor.

The drive pulley 15 is mounted on the conveyor frame structure 14 on a shaft 17, supported at its ends on said frame on shaft supports 18, 18, and is shown as being driven from a motor 19 through a speed reducer 20. A chain and sprocket drive 21 is herein shown as being provided to drive the drive pulley from the motor 19 and speed reducer 20, it being understood that any form of drive desired may be provided. The idler pulley 16 is shown as being mounted on a shaft 23 supported at its ends on shaft supports 24, 24, on a take-up carriage 25. The take-up carriage 25 is shown as being movably mounted on the conveyor frame structure 14 on wheels 26, 26, riding between the flanges (not shown) of the side frame members of the frame structure. The take-up carriage 25 is constantly urged toward the inby end of said frame structure to maintain the belt 11 taut between the drive and driven pulleys 15 and 16 by a gravity take-up 27. The take-up 27 is shown as being in the form of a weight 28 on the end of a cable 29, connected at its end opposite said weight to the carriage 25. The cable 29 is shown as being trained around an idler pulley 30 adjacent the inby end of the conveyor and the weight 27 may move into a pit 31 of sufficient depth to provide the required take-up for the belt.

While the belt 11 may be of any well known form, and made of any suitable material, the device of my invention is particularly adaptable to endless steel belts normally taut and flat when in unloaded condition, but deforming to the form of the troughed rollers 12, 12 when loaded, to form a material-carrying trough of sufficient depth to efficiently carry loose material.

The idler roller or pulley 16 is shown as having a sprocket 32 driven therefrom, for driving a control switch 33 through an endless drive chain 34, to control certain operations of the conveyor and of the next preceding conveyor discharging material thereinto. The switch 33 may be of a well-known form of roller switch wherein contacts are made when the conveyor reaches a certain predetermined speed and are broken when the speed of the conveyor drops below this speed. Said switch and the control connections therefor are well known to those skilled in the art and are no part of the present invention, so need not be herein shown or described further.

Referring now to the diagrammatic illustration of my invention in Figures 2, 3 and 4 and the general theory upon which the belt 11 is maintained in self-centered relation with respect to its driving and driven pulleys, the drive pulley 15 is diagrammatically illustrated as being divided into two halves, one half comprising an inclined roller 36 and the other half of which comprises an oppositely inclined roller 37. The rollers 36 and 37 are shown as being arranged in end-to-end relation with respect to each other and tilted downwardly about a common center "A."

In a like manner, the direction changing idler pulley 16 is in two halves and comprises two oppositely inclined rollers 39 and 40 arranged in end-to-end relation with respect to each other and tilted upwardly about a common center "B."

As an alternate structure pulley 16 may be driven and pulley 15 may be an idler. Or, both may be driven.

The rollers 36 and 37 of the drive pulley 15 are connected together to rotate at the same angular velocities, as will hereinafter more clearly appear as this specification proceeds. The drive pulley 15 thus has cylindrical belt contact surfaces which are inclined downwardly from the longitudinal center of the load carrying run of the belt and form in effect a belt contact surface convex on the incoming run of the belt and concave on the outgoing run of the belt.

The rollers 39 and 40 of the direction changing idler pulley 16 are likewise connected to rotate together at the same angular velocities and form a contact surface which is inclined upwardly from the longitudinal center of the load carrying run of the belt, and thus form a belt contact surface which is convex on the lower or incoming run of the belt and concave on the upper or outgoing run of the belt.

The two pulleys 15 and 16 thus have convex and concave surfaces respectively at opposite ends of the conveyor, and while oppositely arranged, have the common characteristic that each has a convex belt contact surface on the incoming run of the belt and a concave belt contact surface on the outgoing run of the belt.

With the arrangement just described, when any point on the belt reaches the drive pulley 15, it will make contact at a point on the pulley, as for example, the point "C" in Figure 3. Since the rollers 36 and 37 are cylindrical and have belt contact surfaces of equal area and rotate about axes tilted about a common center, the initial point of contact "C" of the belt with the roller 36 will move toward the center of the drive pulley 15 in a path which may be diagrammatically illustrated by dotted line "D." This same situation will exist for all points on the belt. The tendency, therefore, will be to push both sides of the belt toward the middle. The force pushing the belt toward the middle, however, is not sufficient to buckle the belt, with the result that some slipping will occur between the belt and its drive roller, and if the belt is in the center of the drive pulley, the slipping will occur equally on both rollers 36 and 37. This is apparent because the distance around the pulley is the same from any position in the width of the belt so the pressures on all cross-sections of the pulley are the same and the slipping force on the two pulleys will thus be equal.

If the belt should run off center, there will be more of the belt in contact with one pulley than the other. The pulley having more of the belt in contact with it will thus tend to push that side of the belt toward the center with a greater force than the pulley having less of the belt in contact with it, with the result that the belt will return into centered relationship with respect to the pulley.

The same will be true with the driven direction changing idler 16, as may be seen with reference to Figure 4, where the belt contact points E, E on the two rollers 39 and 40 are shown as moving toward the center of the belt and where the belt contact points on the pulley tend to move the belt toward the center of the idler pulley 16 and maintain the belt in centered relation with respect to the idler pulley 16 in the manner just described with respect to Figure 3.

The pulleys 15 and 16 are of the same general construction except that the pulley 15 has a drive sprocket of the chain and sprocket drive 21 keyed thereto and is driven by said sprocket and the axes of its two rollers 36 and 37 are inclined in an opposite direction from the axes of the two rollers 39 and 40 of the driven pulley 16, so one of said pulleys only need herein be described in detail.

In Figure 5 is shown one form in which the drive and driven pulleys may be constructed and illustrating in particular the construction of the driven pulley 16. The driven pulley 16 is shown as being rotatably mounted on the transverse shaft 23, mounted at its ends in the supports 24, 24 and held from rotation with respect thereto, as by keys 41, 41.

The roller 39 is shown as including a drum 43 encircling the shaft 23 and supported adjacent its ends on end walls 44 and 45. The end walls 44 and 45 are shown being welded to the inner periphery of the drum 43 and as encircling and as being welded to spaced sleeves 46 and 47 at their inner ends. The sleeve 46 is shown as extending outwardly from the wall 44, and as having the sprocket 32 keyed thereto and driven therefrom.

It is, of course, obvious that where the pulley is the driving pulley that the sprocket keyed thereto will serve as a drive sprocket for driving the pulley rather than a driven sprocket, driven therefrom.

The sleeve 46 is shown as being mounted on a bushing 48, drilled eccentrically of its center. As herein shown, the bushing 48 has a central inwardly extending land 49 engaging the shaft 23 and permitting a limited amount of tipping movement of said bushing with repect to said shaft about said land.

The bushing 48 is located in position on the shaft 23 by means of a locating pin 50 and is held from rotation with respect to said shaft by means of a key 51.

The sleeve 47 is journaled on an eccentric bushing 53, spaced inwardly along the shaft 23. The eccentric bushing 53 is similar to the eccentric bushing 48, and is so located on the shaft 23 that its eccentricity is diametrically opposed to the eccentricity of the bushing 48. As herein shown eccentricity of the two bushings 48 and 53 is the same, the eccentricity of the outer bushing being above the longitudinal center of the shaft 23 and the eccentricity of the bushing 53 being below the longitudinal center of said shaft. This tilts the axis of the roller 39 with respect to the longitudinal axis of the shaft 23.

The bushing 53, like the bushing 48, is provided with a central land 54 engaging the shaft 23 and tipping on said shaft about said land. The bushing 53 is located on the shaft 23 in diametrically opposed eccentricity with respect to the bushing 48 by means of a locating pin 55 and a key 56.

It is obvious from the foregoing that where it is desired to incline the axis of rotation of a drum of the pulley downwardly with respect to the longitudinal axis of the shaft 23, as in the case of the driving bulley 15, the bushings 48 and 53 may be reversed and the bushing 48, may be positioned at the inside of the drum with its eccentricity spaced above the axis of the shaft 23 and the bushing 53 may be positioned at the outside of the drum, with its eccentricity below the axis of the shaft 23.

The drum 40 is like the drum 39 and is provided with an end wall 57 extending from a flanged sleeve 59, disposed adjacent the flanged sleeve 47, and an opposite end wall 60 extending from a flanged sleeve 62. The sleeve 59 is rotatably journaled on eccentric bushing 63 like the bushing 53. The bushing 63 is located and held in fixed relation with respect to the shaft 23 as by a locating pin 64 and a key 65. The sleeve 62 is rotatably journaled on an eccentric bushing 66, of an opposite eccentricity from the bushing 63 and exactly like the bushing 48, and located with respect to the shaft 23 and the bushing 66 by a locating pin 67 and a key 69. The sleeves 59 and 62 are shown as being connected together by a cylindrical wall 70 like the wall 58 and forming the drums into integral units. The rollers 39 and 40 are held from axial movement along the shaft 23 by retaining rings 71, 72 and 73. The retaining ring 71 is shown as extending from the bushing 66 and as abutting the outside of the sleeve 62. The retaining ring 73 is shown as being interposed between the bushings 53 and 63 and abuts the inner ends of the sleeves 47 and 59, while the retaining ring 73 is shown as being secured to the shaft 41 at the end thereof adjacent the sprocket 32 and abutting the outer end of the sleeve 46. While retaining collars are herein shown as retaining the drums from axial movement along the shaft 41, it is obvious that collars need not be used and that end thrust bearings may be substituted in their place, if desired. It is also obvious that the retaining rings or collars 71, 72 and 73 may be made of a bearing material if desired.

The means for driving the drum 40 at the same angular velocity as the drum 39 is herein shown as comprising a plurality of pins 75, 75 secured to a flange 74 of the sleeve 47 and projecting inwardly therefrom into engagement with the interior of bushings 76, 76 mounted in a flange 77 of the sleeve 59 in axial alignment with the pins 75, 75. The interior of the bushings 76, 76 may be tapered to conform to the angle of the pins 75, 75 and may be hardened. The pins 75, 75 may be chrome plated to provide a hard engaging surface. Said pins are shown as having semispherical outer engaging end portions, having driving engagement with the respective bushing 76. Due to the opposite angularity of the drums 39 and 40, the pins 75, 75 have point contact with the tapered interiors of the bushings 76, 76 and drive the drum 40 from the drum 39 about the same point for each cycle of rotation thereof.

The two halves 36 and 37 of the drive pulley 15 are rotatably mounted on the shaft 17 on eccentric bushings (not shown) arranged to incline the axes of rotation of said drums downwardly with respect to the longitudinal axis of the shaft 17. The rollers 36 and 37 are connected to be driven together by drive pins (not shown), like the pins 75, 75 which drive the drum 40 from the drum 39. The only difference, therefore, in the drive between the rollers 36 and 37 and 39 and 40 is that in the driven pulley the two halves are driven from the belt and rotate together, while in the drive pulley, the roller 37 is positively driven from the roller 36 to provide a unitary drive pulley convex on the incoming side of the belt and concave on the outgoing side thereof.

It should be noted with reference to Figure 5 that the angle of inclination of the drums 39 and 40 with respect to the horizontal is very slight and may be a few degrees or even minutes from the horizontal. The angle may be dependent upon the coefficient of friction between the contact surface of the pulley and the belt, and may be varied for different forms of belts and contact surfaces on the drums.

As shown in Figure 5, each drum 39 and 40 is covered with spiral lagging 80 and 81, respectively. The lagging may consist of any suitable material commonly used to increase the coefficient of friction between the surface of a pulley and its belt trained thereover. The face of the left hand or driving roller 39 may preferably be wrapped with a right hand wrap, while the face of the left hand or driven drum may be preferably wrapped with a left hand wrap. The wrapping may be secured to the surface of the drum in any suitable manner as by self-tapping screws (not shown).

It may be seen from the foregoing that a new and improved form of a self-aligning belt conveyor has been provided wherein the belt is maintained in accurate alignment on the drive and driven pulleys of the conveyor by providing pulleys having convex contact surfaces contacting the incoming run of the belt and concave contact surfaces contacting the outgoing run of the belt, to continually progress the point contacts of the belt on the pulleys toward the center of the pulleys.

It will be understood that modifications and variations may be effected without departing from the scope of the novel concepts of the present invention. For example, any suitable flexible coupling means may be provided to connect the drums 39, 40 for rotation at the same angular velocity.

I claim as my invention:

1. A self-centering direction changing pulley for belt conveyors comprising two rollers aligned in end-to-end relation in planes perpendicular to the plane of travel of the conveyor, means connected between said rollers for driving one of said rollers from the other, and means tilting the axes of rotation of said rollers about a common axis intersecting the longitudinal axis of the conveyor and maintaining the axes of said rollers so tilted during operation of the conveyor and positioning the belt contact faces of said rollers to continually advance the belt contact points therewith, toward the center of the pulley.

2. A self-centering direction changing pulley for belt conveyors comprising two rollers aligned in end-to-end relation in a plane perpendicular to the plane of travel of the conveyor and rotating about oppositely tilted axes, a point contact drive connection from one of said rollers to the other, driving said other roller at the same angular velocity as said one roller, and spaced bearing means for each of said rollers tilting the axes of said rollers in opposite directions about a common axis intersecting the longitudinal axis of the conveyor, and positioning the belt contact surfaces of said rollers to continually advance the belt contact points toward the center of said pulley.

3. A self-aligning pulley for belt conveyors comprising two rollers arranged in end-to-end relation with respect to each other, a stationary shaft, a plurality of eccentric bearings spaced along said shaft and secured thereto and having said rollers journaled thereon, the eccentricity of the inner of said bearings being diametrically opposed to the eccentricity of the outer of said bearings, said bearings journaling said rollers to rotate about said shaft on oppositely inclined axes intersecting the longitudinal center of said shaft, means for driving said rollers to rotate together at the same angular velocity, said eccentric bearings positioning the faces of said rollers to form convex belt-engaging surfaces on the incoming run of the belt and concave belt-engaging surfaces on the outgoing run thereof, continually advancing the points of belt contact toward the center of said pulley.

4. In a self-aligning pulley for belt conveyors, two aligned concentric rollers, a shaft supporting said rollers in end-to-end relation with respect to each other, and means journaling said rollers on said shaft and oppositely tilting the axes of rotation thereof with respect to the longitudinal axis of said shaft comprising spaced inner and outer eccentric bearings for each of said rollers, secured to said shaft, the inner of said bearings being of one eccentricity and the other of said bearings being of a diametrically opposed eccentricity, and means driving one of said rollers from the other.

5. In a self-aligning pulley for belt conveyors, a fixed shaft, two aligned rollers mounted on said shaft in end-to-end relation with respect to each other, means journaling said rollers on said shaft to rotate about axes inclined in opposite directions with respect to the longitudinal axis of said shaft comprising an inner and outer eccentric bearing for each of said rollers, means securing said bearings to said shaft and holding said bearings from rotation with respect thereto, the eccentricity of the inner of said bearings being opposed to the eccentricity of the outer of said bearings, and a plurality of pins projecting axially from an end of one of said rollers and spaced radially from the center thereof and having point driving contact with the adjacent end of the other of said rollers.

6. A self-aligning belt conveyor comprising two spaced direction changing pulleys and an endless belt trained thereabout, one of said pulleys being a drive pulley and the other being an idler pulley, means for driving said drive pulley, said drive and idler pulleys each comprising two rollers aligned in end-to-end relation, the axes of which lie in a common plane perpendicular to the longitudinal axis of the conveyor and tilted about a common center intersecting the longitudinal axis of the conveyor, means maintaining the axes of the drive pulley tilted downwardly with respect to the center of the conveyor and other means maintaining the axes of the driven pulley tilted upwardly with respect to the center of the conveyor and positioning said rollers to form a convex belt contact surface engaging the load-carrying run of the belt at the drive end thereof, and a concave belt contact surface engaging the load-carrying run of the conveyor at the idler end thereof.

7. A self-aligning belt conveyor comprising a drive pulley at one end of the conveyor, an idler pulley at the opposite end of the conveyor, an endless belt stretched taut therebetween, said drive and idler pulleys each being in two halves mounted in end-to-end relation with respect to each other, means providing bearing support for said pulleys and inclining the halves of said pulleys upwardly and downwardly about a common center intersecting the longitudinal axis of the conveyor, to present oppositely inclined belt-engaging surfaces, the apices of which are on the incoming side of the belt at both ends of the conveyor and in alignment with the longitudinal center thereof.

8. A self-aligning belt conveyor comprising a drive pulley at one end of the conveyor, an idler pulley at the opposite end of the conveyor, an endless belt stretched taut therebetween, said drive and idler pulleys each being in two halves mounted in end-to-end relation with respect to each other, means providing bearing support for said pulleys and inclining the halves of said pulleys upwardly and downwardly about a common center, to present oppositely inclined belt-engaging surfaces, the apices of which are on the incoming side of the belt at both ends of the conveyor and in alignment with the longitudinal center thereof, comprising two eccentric bearings for each half of each pulley, the eccentricity of the inner of said bearings being diametrically opposed to the eccentricity of the outer of said bearings, and means connecting said halves of each pulley to rotate together.

9. A self-aligning belt conveyor comprising a drive pulley at one end of the conveyor, an idler pulley at the opposite end of the conveyor, an endless belt stretched taut therebetween, said drive and idler pulleys each being in two halves mounted in end-to-end relation with respect to each other, means providing bearing support for said pulleys and inclining the halves of said pulleys upwardly and downwardly about a common center, to present oppositely inclined belt-engaging surfaces, the apices of which are on the incoming side of the belt at both ends of the conveyor and in alignment with the longitudinal center thereof, comprising two eccentric bearings for each half of each pulley and a shaft for each pulley forming a support for said bearings, the eccentricity of the inner of said bearings being diametrically opposed to the eccentricity of the outer of said bearings, and said bearings each being rockingly mounted on said shaft for limited rocking movement with respect thereto.

10. A self-aligning belt conveyor comprising a drive pulley at one end of the conveyor, an idler pulley at the opposite end of the conveyor, an endless belt stretched taut therebetween, said drive and idler pulleys each being in two halves mounted in end-to-end relation with respect to each other, means providing bearing support for said pulleys and inclining the halves of said pulleys upwardly and downwardly about a common center, to present oppositely inclined belt-engaging surfaces, the apices of which are on the incoming side of the belt at both ends of the conveyor and in alignment with the longitudinal center thereof, comprising two eccentric bearings for each half of each pulley, a shaft for each pulley forming a support for said bearings, the eccentricity of the inner of said bearings being diametrically opposed to the eccentricity of the outer of said bearings, and each of said bearings having an inwardly extending land thereon engaging said shaft and accommodating said bearings for limited tilting movement with respect to said shaft.

11. In a self-aligning pulley for belt conveyors, two aligned concentric rollers, a shaft supporting said rollers in end-to-end relation, means journaling said rollers on said shaft and tilting the axes of rotation thereof with respect to said shaft about a common center comprising two eccentric bearings for each roller, the eccentricity of the inner of said bearings being diametrically opposed to the eccentricity of the outer of said bearings, and each of said bearings having a land thereon engaging said shaft and mounting said bearing on said shaft for limited rocking movement with respect thereto.

12. A self-aligning drive unit for a conveyor belt comprising two drive rollers journaled in end-to-end relation with respect to each other and having equal area belt contact surfaces extending therearound for at least 180°, means driving one of said rollers, a flexible drive connection from said one roller to the other of said rollers to effect rotation of the other of said rollers at the same angular velocity as said one roller, and spaced bearings for each of said rollers, tilting said rollers oppositely with respect to each other about axes disposed adjacent the center of the conveyor and maintaining said rollers so tilted to present a convex belt engaging surface on the incoming run of the belt and a concave belt engaging surface on the outgoing run of the belt, continually advancing the belt contact points towards the center of the conveyor.

13. In a self-aligning pulley for belt conveyors comprising two rollers arranged in end-to-end relation with respect to each other, a shaft, a flexible drive connection between said rollers effecting rotation of both of said rollers at the same angular velocity, means journaling said rollers on said shaft to rotate about axes inclined in opposite directions with respect to the longitudinal axis of said shaft, comprising an inner and an outer eccentric bearing for each of said rollers, the eccentricity of the inner of said bearings being opposed to the eccentricity of the outer of said bearings, and means maintaining said inner and outer bearings in opposed eccentricity during rotation of said rollers, and maintaining the belt in position to present a convex belt engaging surface on the incoming run of the belt and a concave belt engaging surface on the outgoing run thereof, and continually advancing the belt contact points toward the center of said pulley upon rotation thereof.

References Cited in the file of this patent

UNITED STATES PATENTS

| Number | Name | Date |
|---|---|---|
| 2,262,325 | Kendall | Nov. 11, 1941 |
| 2,593,158 | Lorig | Apr. 15, 1952 |

FOREIGN PATENTS

| Number | Country | Date |
|---|---|---|
| 344,205 | Germany | Nov. 17, 1921 |